(12) United States Patent
Smits (10) Patent No.: US 11,933,026 B2
(45) Date of Patent: Mar. 19, 2024

(54) CAMERA SYSTEM AND ASSISTANCE SYSTEM FOR A VEHICLE

(71) Applicant: Continental Automotive GmbH, Hannover (DE)

(72) Inventor: Thomas Smits, Straelen (DE)

(73) Assignee: Continental Automotive GmbH, Hannover (DE)

( * ) Notice: Subject to any disclaimer, the term of this patent is extended or adjusted under 35 U.S.C. 154(b) by 105 days.

(21) Appl. No.: 17/610,375

(22) PCT Filed: May 13, 2020

(86) PCT No.: PCT/EP2020/063324
§ 371 (c)(1),
(2) Date: Nov. 10, 2021

(87) PCT Pub. No.: WO2020/229534
PCT Pub. Date: Nov. 19, 2020

(65) Prior Publication Data
US 2022/0220708 A1  Jul. 14, 2022

(30) Foreign Application Priority Data
May 14, 2019 (DE) ..................... 10 2019 206 925.8

(51) Int. Cl.
*E02F 9/26* (2006.01)
*B60R 1/23* (2022.01)
(Continued)

(52) U.S. Cl.
CPC ................ *E02F 9/264* (2013.01); *B60R 1/23* (2022.01); *B60R 11/04* (2013.01); *B60R 16/033* (2013.01);
(Continued)

(58) Field of Classification Search
CPC .......... E02F 9/264; E02F 9/0858; B60R 1/23; B60R 11/04; B60R 16/033;
(Continued)

(56) References Cited

U.S. PATENT DOCUMENTS

2006/0050149 A1* 3/2006 Lang ................ H04N 21/42684
348/E7.086
2006/0098094 A1* 5/2006 Lott ......................... B60R 1/00
348/148
(Continued)

FOREIGN PATENT DOCUMENTS

CN  108583460 A  9/2018
CN  108683833 A  10/2018
(Continued)

OTHER PUBLICATIONS

Office Action dated Nov. 29, 2019 from corresponding German Patent Application No. DE 10 2019 206 925.8.
(Continued)

*Primary Examiner* — Matthew David Kim (57) ABSTRACT

A camera system for a vehicle comprises a holding device that can be fastened removably to the outside of the vehicle and that comprises an accumulator, a camera that can be fastened removably to the holding device, wherein electrical energy can be transferred to the camera from the accumulator to operate the camera.

8 Claims, 4 Drawing Sheets

(51) Int. Cl.
  *B60R 11/04* (2006.01)
  *B60R 16/033* (2006.01)
  *E02F 9/08* (2006.01)
  *H04N 7/18* (2006.01)
  *B60R 11/00* (2006.01)

(52) U.S. Cl.
  CPC ............ *E02F 9/0858* (2013.01); *H04N 7/181* (2013.01); *B60R 2011/004* (2013.01); *B60R 2011/0057* (2013.01); *B60R 2300/105* (2013.01); *B60R 2300/303* (2013.01)

(58) Field of Classification Search
  CPC ....... B60R 2011/004; B60R 2011/0057; B60R 2300/105; B60R 2300/303; H04N 7/181
  USPC .......................................................... 348/148
  See application file for complete search history.

(56) References Cited

U.S. PATENT DOCUMENTS

| | | | | |
|---|---|---|---|---|
| 2009/0096870 A1* | 4/2009 | Zheng | .................... | B60K 37/06 348/148 |
| 2009/0116831 A1* | 5/2009 | Lindsay | ................ | H02J 7/0045 396/539 |
| 2011/0234797 A1* | 9/2011 | Wende | .................... | H04L 12/42 348/E7.085 |
| 2013/0127999 A1* | 5/2013 | Kawai | ...................... | B60R 1/00 348/148 |
| 2014/0375809 A1* | 12/2014 | Song | ....................... | B60R 11/04 348/148 |
| 2015/0172518 A1 | 6/2015 | Lucas et al. | | |
| 2016/0311375 A1* | 10/2016 | Biemer | ................... | B60R 11/04 |
| 2017/0057423 A1 | 3/2017 | Wang | | |
| 2017/0225685 A1* | 8/2017 | Aoki | ..................... | B60Q 1/346 |
| 2017/0313248 A1 | 11/2017 | Kothari | | |
| 2018/0268697 A1* | 9/2018 | Lin | ....................... | G01S 13/931 |
| 2018/0295316 A1* | 10/2018 | Callis, Jr. | .............. | B64C 39/024 |
| 2019/0084585 A1* | 3/2019 | Fritz | ....................... | B60K 35/00 |
| 2019/0168686 A1* | 6/2019 | Haidong | ................. | B60R 11/04 |
| 2019/0351857 A1* | 11/2019 | Kishi | .................... | G01S 17/931 |
| 2021/0245678 A1 | 8/2021 | Smits | | |

FOREIGN PATENT DOCUMENTS

| | | |
|---|---|---|
| DE | 102017208592 A1 | 11/2018 |
| DE | 102018218735 A1 | 4/2020 |
| JP | 2011035964 A | 2/2011 |
| WO | 2016087903 A1 | 6/2016 |
| WO | 2016119647 A1 | 8/2016 |

OTHER PUBLICATIONS

International Search Report and Written Opinion dated Jun. 29, 2020 from corresponding International Patent Application No. PCT/EP2020/063324.

European Examination Report dated Oct. 24, 2023 for the counterpart European Patent Application No. 20 726 744.4 and translation of same.

* cited by examiner

CAMERA SYSTEM AND ASSISTANCE SYSTEM FOR A VEHICLE

CROSS REFERENCE TO RELATED APPLICATIONS

This U.S. patent application claims the benefit of PCT patent application No. PCT/EP2020/063324, filed May 13, 2020, which claims the benefit of German patent application No. 10 2019 206 925.8, filed May 14, 20198, both of which are hereby incorporated by reference.

TECHNICAL FIELD

A camera system for a vehicle is disclosed, in particular a camera system for an assistance system of the vehicle. An assistance system for a vehicle that comprises a camera system is furthermore disclosed.

BACKGROUND

Vehicles can comprise a camera and a monitor that make pictures from the camera available to a user of the vehicle. Mirror replacement systems in which the fields of view of conventional exterior mirrors are represented by means of the camera and of the monitor are, for example, known. Reversing cameras by means of which regions that cannot be seen with conventional mirrors can be represented are also known.

It is desirable to disclose a camera system for a vehicle that can be used flexibly. It is also desirable to disclose an assistance system for a vehicle that can be employed flexibly.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A camera system for a vehicle is disclosed. An assistance system is also disclosed that comprises a camera system as described here. The features, developments and advantages of the camera system described also apply to the assistance system and vice versa.

According to at least one embodiment the camera system comprises a holding device. The holding device can be fastened removably to the outside of the vehicle. The holding device comprises an accumulator. The camera system comprises a camera. The camera can be fastened removably to the holding device. Electrical energy can be transferred to the camera from the accumulator to operate the camera.

The vehicle is, for example, a motor vehicle such as a private car, a truck or a construction site vehicle such as an excavator. The vehicle is, for example, a trailer for a motor vehicle.

The holding device can be fastened to the vehicle, for example by means of a magnet. The holding device can be fastened in such a way that it can be non-destructively fastened to the vehicle and removed again. The holding device can be fastened to an outer side of the vehicle facing away from an interior space of the vehicle. The holding device can be fastened to the outside of the vehicle, with the result that during operation the holding device is in contact with the environment. The holding device can thus be coupled to different vehicles. The holding device can be coupled to different cameras. A modular system is thus formed that can be employed flexibly depending on the desired use. It is possible to fasten the holding device only temporarily to the vehicle if use is desired.

The holding device is designed to accommodate and hold the camera. The camera can thus be fastened to the vehicle by means of the holding device. The camera can be fastened to the holding device by means, for example, of magnets. The camera can be removed again from the holding device non-destructively. It is thus, for example, possible to use the camera at a plurality of vehicles, each of which has its own holding device. In addition, it is possible to mount the holding device on various vehicles. For example, it is possible to mount the holding device on the vehicle only at the time during operation of the vehicle, and otherwise to remove it from the vehicle, for example when the vehicle is parked.

The camera is for example designed as described in DE 10 2017 208 592 or DE 10 2018 218 735.

The holding device can be employed flexibly, and is, not restricted to a special intended application. This is, for example, achieved in that the holding device comprises the accumulator. Alternatively or in addition it is achieved in that the holding device can be fastened removably to the outside of the vehicle. It is thus possible to attach the holding device for periods of time at different locations on the vehicle. The holding device can also be attached at positions where no direct electrical supply is possible. The accumulator of the holding device thus enables operation of the camera even over relatively long periods of time. The possible applications of the camera system in the vehicle field are thus expanded in comparison with conventional camera applications. It is possible here to omit a fixed installation with a permanent electrical supply.

The camera is, for example, designed to transmit its video signal to an assistance system of the vehicle, for example by means of a wireless connection. The images of the camera are, for example, displayed together in common with images from further cameras on one or a plurality of monitors in the vehicle. As a result of the accumulator in the holding device, the operational period of the camera is extended without intermediate charging being necessary. It is also, for example, possible, when the accumulator is discharged, to exchange the holding device for a further holding device with a charged accumulator, so that operation is also possible while the accumulator of the holding device is being charged.

According to at least one embodiment, the holding device comprises an energy transmitting device. The energy transmitting device is electrically coupled to the accumulator. The camera comprises an energy receiving device. The electrical energy can be transmitted wirelessly from the energy transmitting device to the energy receiving device. The energy transmitting device and the energy receiving device each, for example, comprise a coil. Electrical energy can be transmitted wirelessly from the energy transmitting device to the energy receiving device for operation of the camera. It is thus possible according to these exemplary embodiments to supply the camera with electrical energy when operating while fastened in the holding device. For this purpose there is no need for wiring to be provided between the holding device and the camera.

According to at least one embodiment, the camera and the holding device can be arranged, when in a state ready to operate, at a distance from one another. The camera system comprises a cable connection between the camera and the holding device for transmitting the electrical energy. It is, for example, thus possible to fasten the camera at a first position that is primarily selected on the basis of the recording area of the camera.

The holding device can be fastened at a second position at a distance therefrom. For example, the second position is different from the first position. The second position is, for example, primarily selected such that a reliable hold of the holding device is possible. This can, for example, be at a protected location of the vehicle and/or at a position that is not highly exposed to environmental influences when operating. The distance between the holding device and the camera is bridged by means of the cable connection. It is thus possible, in spite of the distance, for the camera to be operated using the electrical energy of the accumulator of the holding device.

According to at least one embodiment the camera system comprises a further holding device. The further holding device can be fastened permanently to the vehicle. The further holding device can be coupled to the holding device. Alternatively or in addition, the further holding device can be coupled to the camera. The further holding device can, for example, be fastened to the vehicle by means of screws or other fastening means. The further holding device may for example be fastened in such a way that it cannot simply be removed again from the vehicle non-destructively.

The further holding device is, for example, fastened at the first position if the holding device and the camera are arranged at a distance from one another. The camera is then fastened to the vehicle by means of the further holding device. The holding device that serves to supply electrical energy is arranged at a distance therefrom.

It is also possible to fasten the holding device to the vehicle by means of the further holding device. The camera is then, for example, fastened to the holding device. Different stacking variants can be formed, depending on the application that is desired and required.

According to at least one embodiment the camera comprises a further accumulator. The further accumulator of the camera can be charged by means of the holding device. This makes it possible to extend the operating time of the camera.

According to at least one embodiment, the camera is designed, when in a state in which the camera is fastened to the holding device, to receive position data from the holding device by means of wireless near-field communication. This makes it possible to determine a relative position of the holding device with respect to the vehicle. The position data are, for example, transmitted by means of RFID, NFC, Bluetooth or another near-field communication standard. The position data are, for example, stored in a memory of the holding device. The ascertainment and transmission of the position data takes place, for example, as described in DE 10 2018 218 735.

The camera is, for example, designed to transmit its video signal, together with the position data, to the assistance system of the vehicle for further processing. It is thus easily and reliably possible to combine the image of the camera with images of further cameras of the vehicle and, for example, to display them together. Joining the images of the different cameras together is easily and reliably possible depending on the accurate knowledge of the position of the camera. It is thus possible to integrate the mobile camera and the mobile holding device into the assistance system of the vehicle.

According to at least one embodiment, the camera system comprises a plurality of holding devices that are fastened removably to one another. The holding devices are designed to supply each other mutually with electrical energy. It is possible in this way to further increase the operating time of the camera.

According to at least one embodiment, the holding device comprises a signal amplifier for extending the range of a wireless video signal of the camera. The signal amplifier is designed for extending the range of a wireless signal of the camera. The camera is, for example, designed to transmit its video signal to a receiving device of the vehicle by means of a WLAN standard or another wireless connection. The wireless video signal of the camera can be amplified by means of the signal amplifier of the holding device, and the range can thus be improved. For example, when the holding device is mounted at the rear of a metal trailer, a sufficiently stable transmission of the wireless video signal is nevertheless possible.

According to at least one embodiment, an assistance system for a vehicle comprises a camera system in accordance with at least one embodiment. The assistance system comprises at least one further camera. The assistance system comprises a monitor. Images from the camera and the further camera can be displayed in combined form on the monitor. It is possible in this way to display the image of the mobile camera in combination with the image of the further camera. The position of the camera of the camera system and the position of the further camera relative to one another are known for this purpose.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
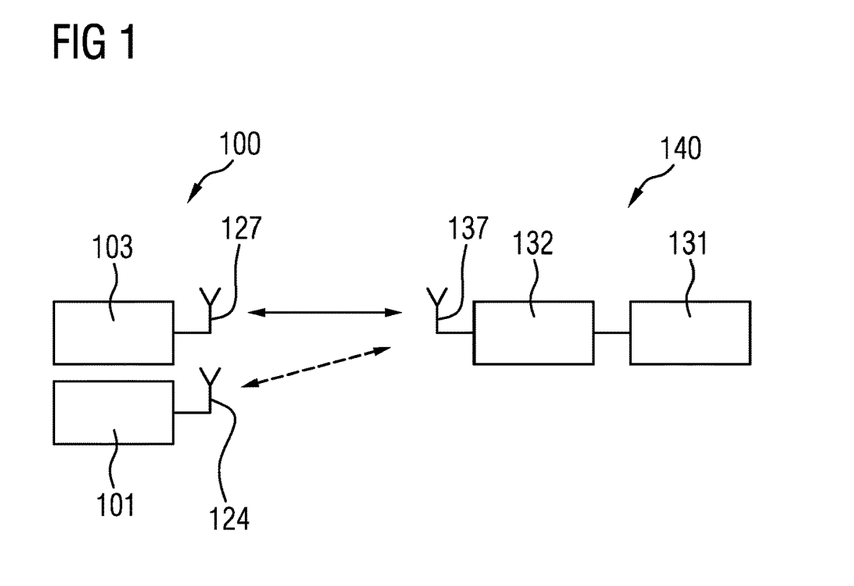
FIG. 1 shows a schematic illustration of an assistance system according to one exemplary embodiment.
Figure 7:
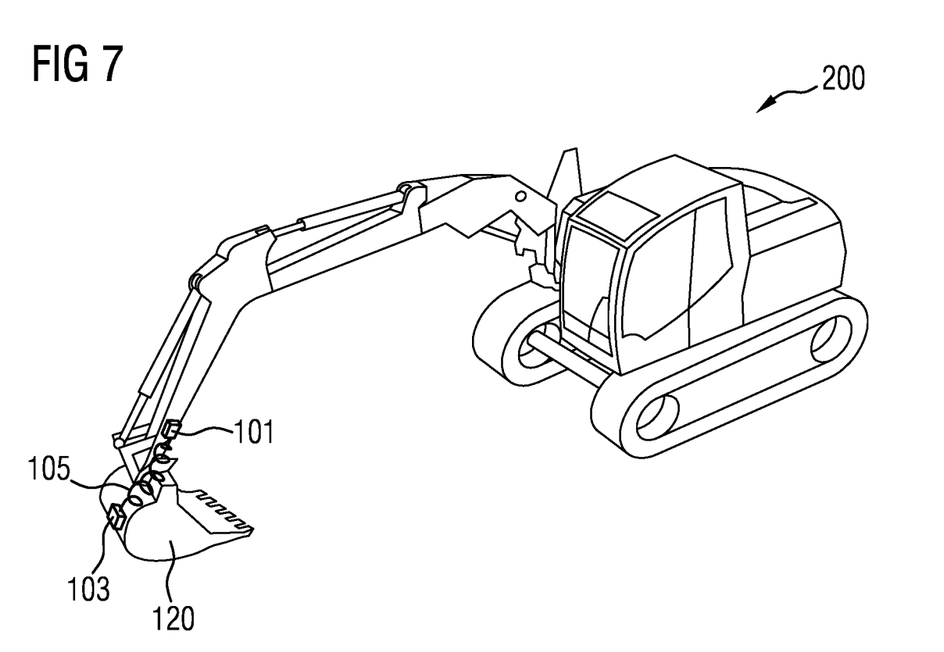

FIG. 1 shows a schematic illustration of an assistance system 140 for a vehicle 200 (FIG. 7). The assistance system 140 is, for example, part of a mirror replacement system and/or part of a reversing assistance system for a user of the vehicle. The assistance system 140 is, for example, part of another type of camera monitor system for the vehicle 200.

The assistance system 140 comprises a camera system 100. The camera system 100 comprises a camera 103. The camera system comprises a holding device 101. The holding device 101 can be fastened to the vehicle 200. The camera 103 can be fastened reversibly to the holding device 101. The camera system, for example, has an unfastened state in which the holding device 101 is not fastened to the vehicle 200. In a fastened state, the holding device 101 is fastened to the vehicle 200, and the camera 103 is held by the holding device 101 and is in particular not movable, or only insignificantly movable, relative to the holding device 101.

The assistance system 140 comprises a receiving device 132 and a monitor 131. Further elements such as control devices and image processing devices can be provided. The monitor 131 is for example arranged in the interior of the vehicle 200 and, for example, within the field of view of a user of the vehicle 200. The monitor 131 serves to display images or videos from the camera 103.

The image signals of the camera 103 are transmitted in operation wirelessly by means of radio technology between the camera system 100 and the receiving unit 132. The camera 103 comprises an antenna 127 for this purpose. The receiving device 132 correspondingly comprises the antenna 137. The holding device 101 optionally also comprises an antenna 124. The antenna 124 is, for example, part of a signal amplifier, which is provided according to exemplary embodiments in the holding device 101.

According to some exemplary embodiments, the holding device 101 may not comprise any antennas of its own. Only the camera 103 comprises the antenna 127. A wireless connection for transmitting the image data is only formed between the camera 103 and the receiving device 132.

The camera 103 is a wireless camera for extending the field-of-view in the vehicle 200. The camera 103 can be used in a mobile and flexible manner, and can, for example, be coupled to a plurality of different holding devices 101 of different vehicles. The camera 103 does not in itself have to be directly connected to the vehicle and does not, for example, have to be screwed to the vehicle. The camera 103 is fastened reversibly to the vehicle by means of the holding device 101. The holding device 101 is fastened reversibly to the vehicle. A temporary attachment of the camera 103 to the vehicle is thus enabled by means of the holding device 101. It is thus possible also to use the camera 103 when permanent installations are not wanted.

Figure 2:
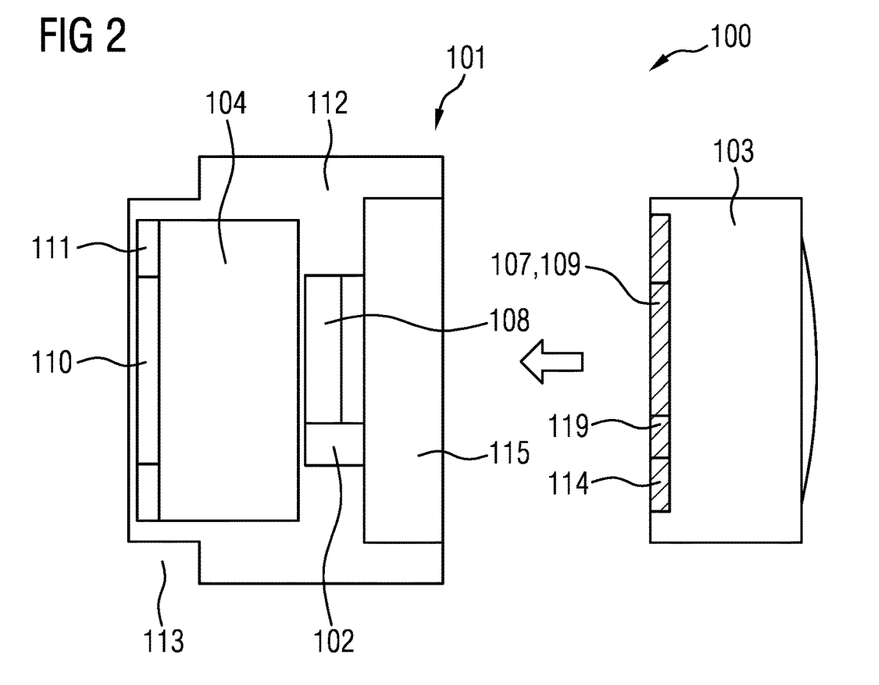
FIGS. 2 to 5 each show a schematic illustration of a camera system according to various exemplary embodiments.

FIG. 2 shows the camera system 100 according to one exemplary embodiment.

The camera 103 comprises an accumulator 107. In operation, this serves for example to supply the camera 103 with electrical energy. According to further exemplary embodiments, the camera 103 does not comprise its own accumulator. The camera 103 comprises an energy receiving device 109. The energy receiving device comprises, for example, a coil. The energy receiving device 109 serves for the inductive energy supply of the camera 103. The camera 103 comprises a magnet 114. The camera can be fastened to the holding device 101 by means of the magnet 114. According to some exemplary embodiments, the magnet 114 is used, alternatively or in addition, to fasten the camera 103 directly to the vehicle 200. The camera 103 comprises a communication interface 119. The communication interface 119 serves to exchange information with the holding device 101. The communication interface 119 in particular enables wireless communication. The communication interface 119 enables, for example, near-field communication by means of NFC, Bluetooth or other communication standards.

The holding device 101 comprises an accumulator 104. The accumulator 104 serves to store electrical energy. The holding device 101 comprises an energy transmitting device 108. The energy transmitting device 108 comprises, for example, a coil. The energy transmitting device 108, together with the energy receiving device 109 of the camera 103, serves for the inductive transmission of electrical energy from the holding device 101 to the camera 103. The energy transmitting device 108 of the holding device 101 is electrically connected to the accumulator 104. The energy transmitting device 108 and the accumulator 104 are, in particular, arranged in a common housing 112 of the holding device 101.

The holding device 101 comprises an energy receiving device 110. The energy receiving device 110 of the holding device 101 serves for the inductive reception of electrical energy. It is thus possible to charge the accumulator 104 of the holding device 101 inductively by means of the energy receiving device 110 of the holding device 101. The energy receiving device 110 of the holding device 101 is electrically connected to the accumulator 104.

The holding device 101 comprises a magnet 111. The magnet 111 serves to fasten the holding device 101 to a substrate. It is, for example, possible to fasten the holding device 101 directly to the vehicle 200 by means of the magnet 114. It is also possible to fasten the holding device 101 to a further holding device 101, 106 (FIG. 3) by means of the magnet 114.

The housing 112 of the holding device 101 comprises a receptacle 115. The receptacle 115 serves to accommodate the camera 103. The receptacle 115 also serves to accommodate a further holding device 101, 106.

The housing 112 has a recess 113 at a side lying opposite the receptacle 115. The recess 113 is designed in correspondence to the receptacle 115, so that a stack of holding devices 101, 106 can be formed.

The holding device 101 comprises a communication interface 102. The communication interface 102 is designed for wireless communication with the communication interface 119 of the camera 103. An exchange of position information and/or control information is, for example, possible by means of the communication interfaces 102, 119. The position information for example comprises information about the position at which the holding device 101, and thereby the camera 103, is fastened relative to the vehicle 200.

The reversible fastening of the holding device 101 by means of magnets 111, along with the energy storage in the accumulator 104 of the holding device 101, enables a mobile use independently of special intended applications. The accumulator 104 enables an adequately long operating time for the camera 103. Sufficient space is available in the holding device 101 for a sufficiently large accumulator 104 to be used. The camera 103 can thus be operated for a sufficiently long time, without the camera 103 needing to be provided with a large accumulator 104 for this purpose. The operating time of the camera 103 is thus sufficient to extend the application possibilities of the camera system 100 without a fixed installation with permanent electrical supply being necessary for the purpose. The mobile holding device 101 further offers the possibility of mobile use with an operating time that is significantly longer than by means of the accumulator 107 of the camera 103 alone.

The holding device 101 that enables the wireless, inductive supply of electrical energy to the camera 103, is also fitted with the accumulator 104. In the exemplary embodiment of FIG. 2, the components of the holding device 101 are housed in a single, common, closed housing 112. The illustrated shape of the housing is merely exemplary. According to embodiments, a round or cylindrical shape is particularly useful. The round or cylindrical shape enables, for example, accurate fitting and thereby reliable inductive charging.

It is also possible for a different shape to be provided. It is, for example, possible to realize better adhesion to the substrate by enlarging the area in comparison with the height. It is, for example, possible in that way to realize a lower tilting moment. Alternatively or in addition it is, for example, possible to be able to accommodate a larger number of magnets 111 in this way.

Figure 3:
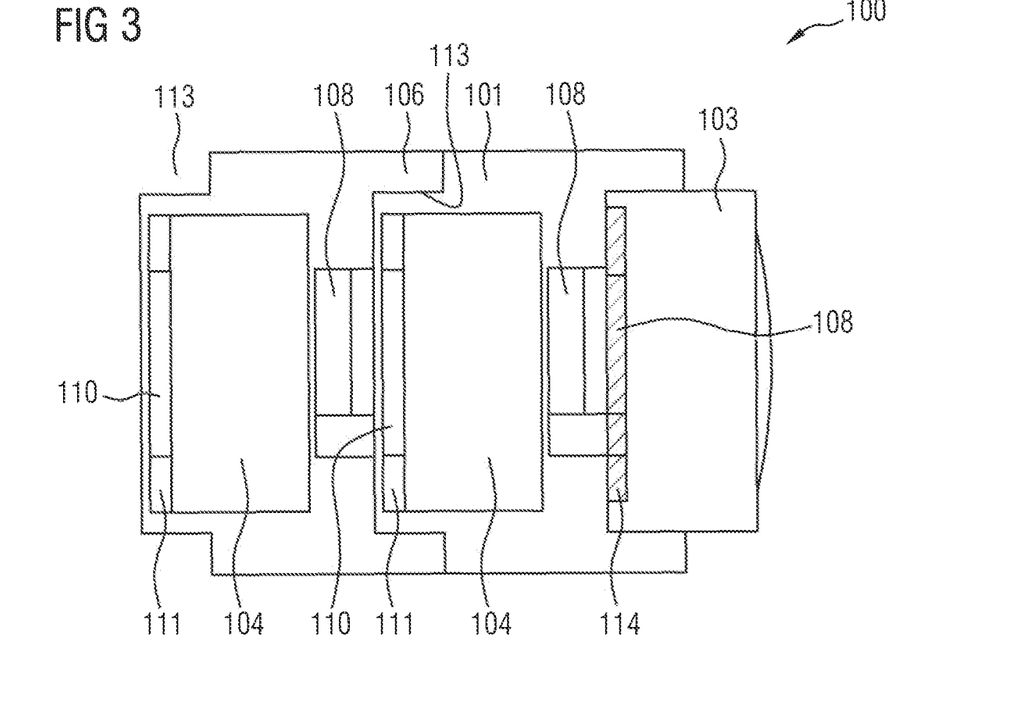

FIG. 3 shows the camera system 100 in which multiple holding devices 101, 106 are stacked. The camera 103 is housed in the receptacle 115 of the outermost holding device 101. The holding devices 101, 106 are coupled to one another electrically by means of the respective energy transmitting devices 108 and energy receiving devices 110 of the holding devices 101, 106. In this way it is possible to utilize the capacity of the individual accumulators 104 of the holding devices 101, 106 together in order to increase the operating time for the camera 103 further. It is, of course, also possible to stack more than two holding devices 101, 106. A modular camera system 100 is realized on the basis of the shape of the housing 112 with the receptacle 115 and the recess 113. The components of the camera system 100 can be combined with one another and reused in any desired way.

It is, for example, possible to place the camera 103 in a charging cradle with an external power supply. The camera 103 can, alternatively, be placed in the holding device 101 with the accumulator 104. The holding device 101 can, in turn, itself be placed in a charging cradle that is connected to an external power supply. Alternatively, it is possible to couple the holding device 101 to the further holding device 106.

The holding devices 101, 106 can thus each themselves be charged and/or can supply another consumer, for example the camera 103 or a further holding device 101, 106, with electrical energy. It is thus possible, as an exemplary combination, to provide a charging cradle that is connected directly to the electrical network of the vehicle 200. This is used to charge the accumulator 107 of the camera 103.

A further combination consists of the holding device 101 and the camera 103.

A further combination comprises the charging cradle, which is connected directly to an external electrical grid, and the holding device 101. In a further combination, the charging cradle is used to supply the holding device 101 with electrical energy. The camera 103 is connected to the holding device 101.

In a further combination, the two holding devices 101, 106, are connected to one another in order to be able to use the capacity of the respective accumulators 104 jointly. A plurality of holding devices 101, 106 can be combined together and, for example, the camera 103 at the end can use the capacity of all of the accumulators 104. A stack of a plurality of holding devices 101, 106 can be combined with the charging cradle and also with the camera 103. Many other combinations are possible, depending in each case on the application site and the desired use of the camera system 100.

Figure 4:
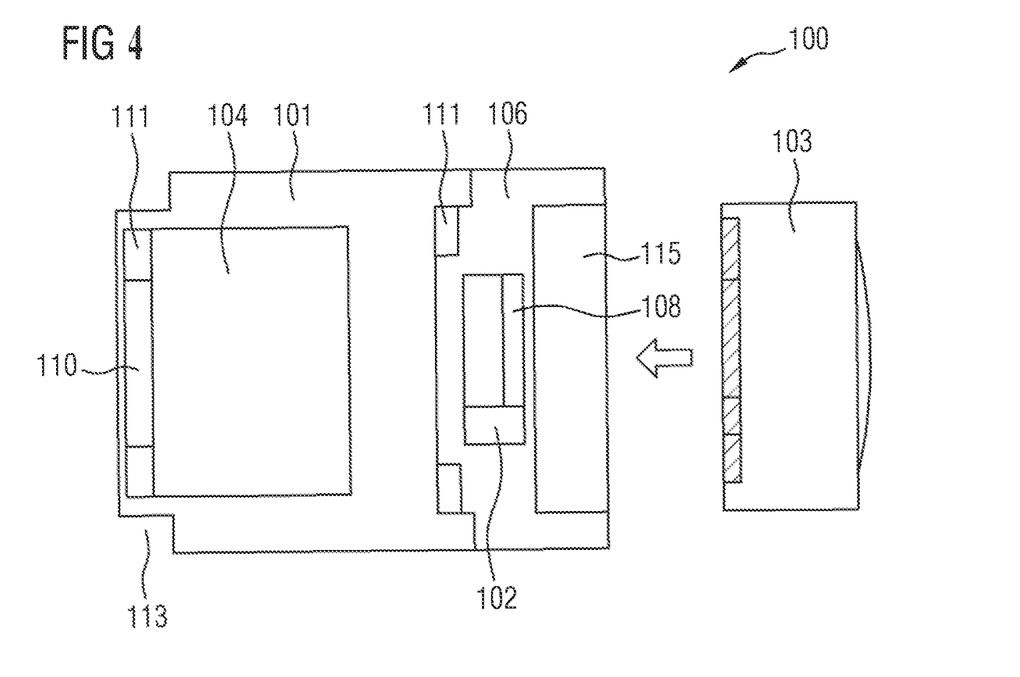

FIG. 4 shows the camera system 100 according to a further exemplary embodiment. The holding device 101 comprises the accumulator 104. The other elements, for example the energy transmitting device 108 and the communication interface 102, may be omitted. The magnets 111 are provided and, for example, the receiving device 110 of the holding device 101. The holding device 101 can thus be fastened to the vehicle 200 and supplied with electrical energy for charging the accumulator 104.

The communication interface 102 and the energy transmitting device 108 are integrated into the further holding device 106. In operation, the camera 103 is, for example, used in the further holding device 106.

Figure 5:
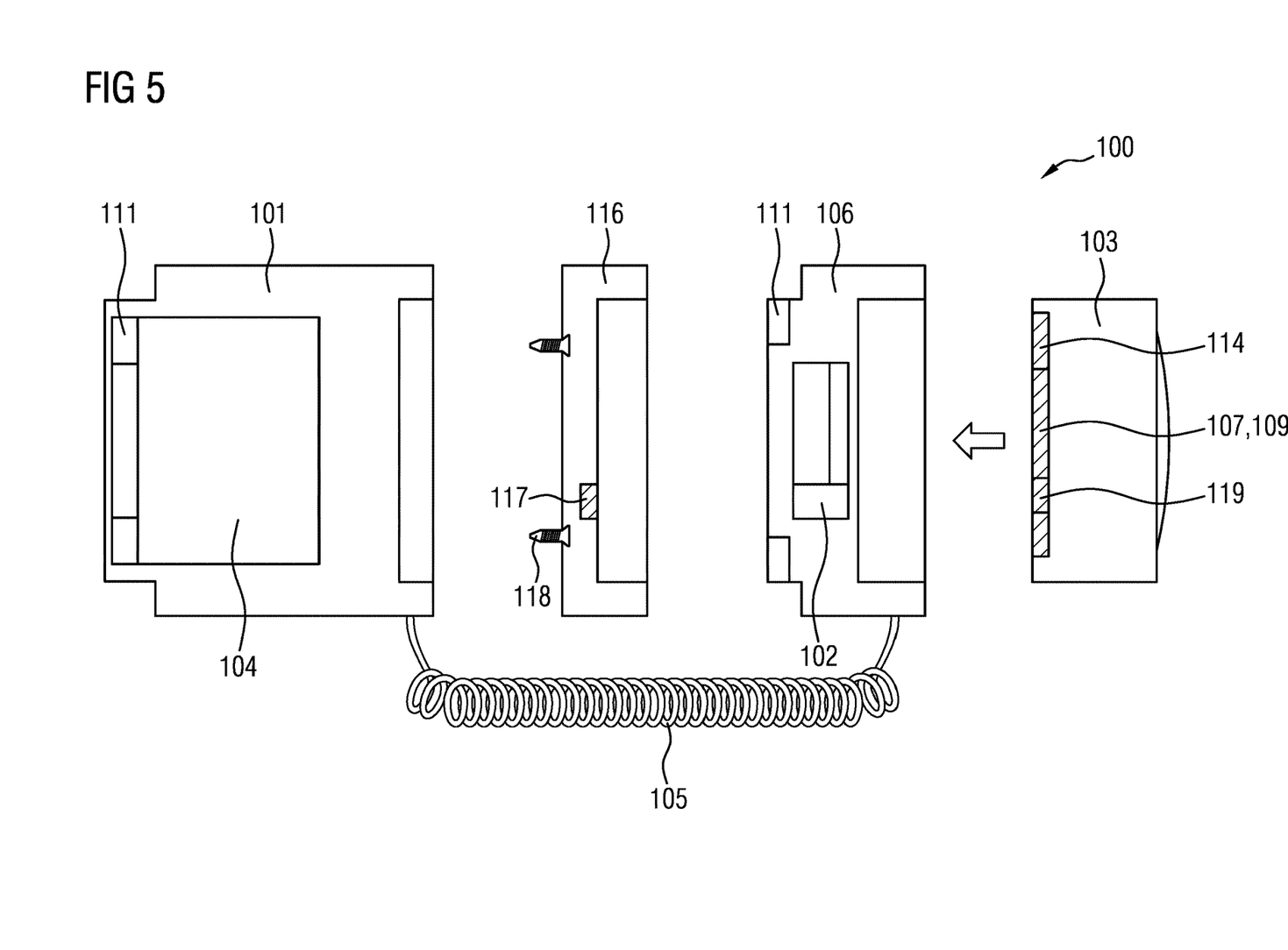

The holding device 101 and the further holding device 106 are, for example, connected together by a cable connection 105 (FIG. 5). The cable connection 105 serves to transmit electrical energy from the accumulator 104 of the holding device 101 to the energy transmitting device 108 of the further holding device 106.

It is, for example, possible that the cable of the cable connection 105 can be accommodated in the housing 112 of the holding device 101, for example can be wound up by a mechanism. It is alternatively possible to use a spiral cable.

The cable connection 105 enables a flexible use of the holding device 101 and of the further holding device 106, even when spaced apart from one another. It is possible for the holding device 101 and a further holding device 106 to be positioned a short distance from one another, for example with a spacing of between one and two meters.

The further holding device 106 for holding the camera 103 is, for example, fastened directly to the vehicle 200. It is alternatively possible to use a holder 116 that is connected permanently to the vehicle 200, as is illustrated by way of example in FIG. 5. The holder 116 is, for example, designed as is described in DE 10 2018 218 735.

The holder 116 is permanently installed at the vehicle by means of a fastening 118, for example screws. The further holding device 106 can be fastened in the holder 116 by means of the magnets 111. The holder 116 comprises a communication interface 117. The communication interface 117 comprises, for example, a memory in which position data of the permanently installed holder 116 are stored. It is possible to transmit the position data and information between the individual elements by means of wireless communication between the communication interface 117 of the holder 116 and the communication interface 102 of the further holding device 106, as well as the communication interface 119 of the camera 103.

The communication interface 117 of the holder 116 has, for example, a tag, e.g. an RFID tag, that can be read and/or written using short-range radio by the further holding device 106 or the camera 103. The holder 116 can be uniquely identified by means of the tag, and associated with the position and with its installation site. This simplifies integration of the images of the camera 103 into a common display of multiple images from different cameras, for example by means of stitching.

Figure 6:
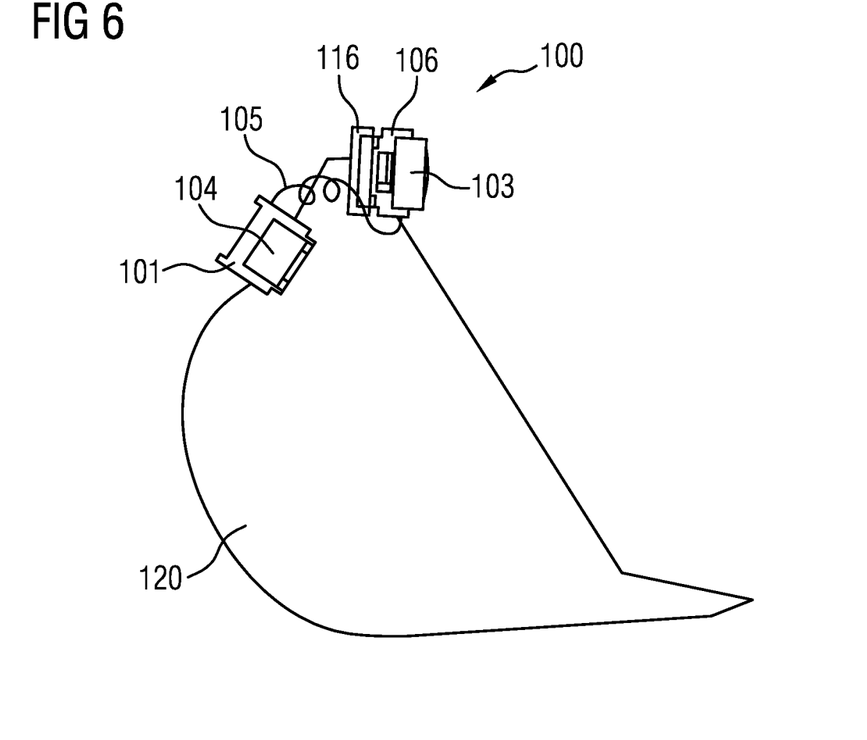
FIGS. 6 and 7 each show a schematic illustration of a camera system in a state ready for operation according to exemplary embodiments.

FIGS. 6 and 7 each show the camera system 100 with the cable connection 105 in exemplary applications. The camera system 100 is attached to an excavator bucket 120. The holder 116 is attached at a position such that relevant fields of view can be represented by the camera 103. The holding device 101 with the accumulator 104 is attached at a position that is at a distance from the holder 116. The position of the holding device 101 is, for example, selected such that the holding device 101 interferes with operation as little as possible, and remains securely fastened to the excavator bucket 120 of the vehicle 200.

The position of the holder 116 is, for example, predefined or determined at assembly, and is saved in a memory of the communication interface 117 of the holder 116. It is thus possible for the camera 106 to be automatically recognized when operating, and for the place at which it is arranged, and with which part of the vehicle 200 (the excavator bucket 120 in this example), to be identified. An identification of the tool by means of the holder 116 is, for example, possible in the case of an excavator that uses different tools. The defined position of the camera 103 in operation is also known. Easy stitching of the images of the camera 103 to images from further cameras is thus possible. According to the exemplary embodiment, the further holding device 106 is omitted, and the camera 103 is inserted directly into the holder 116.

According to further exemplary embodiments, the camera 103 is not inserted directly into the holder 116, but into the further holding device 106. The further holding device 106 is in turn fastened to the holder 116. The holding device 101 with the accumulator 104 can therefore be placed particularly stably at a suitable location independently of a predefined position for the camera 103. The position for the holding device 101 comprises, for example, a solid metal surface and/or metal of high thickness, so that stable fastening is possible by means of the magnet 111. The operating time for the camera 103 is thereby increased. Convenient stitching is thus possible, without hard wiring being necessary for the camera 103. In addition, a plug-in connector or cable connection for transmitting the electrical energy between the tool, the excavator bucket 120, for example, and the main vehicle 200 is not necessary. The camera system 100 can thus also be retrofitted effectively.

According to a further exemplary embodiment, the holder 116 is omitted. The camera 103, with the further holding device 106, is placed and fastened directly at the vehicle 200 or the tool (the excavator bucket 120, in this example). It is thus possible to fasten the camera 103 at a position at which the camera view is required at the time. The holding device 101 can here remain fastened at a position that is as mechanically suitable as possible, at a distance from the further holding device 106.

Even without the permanently installed holder 116, use of the camera 106 in the camera system 100 is effectively possible. Exact position information is not necessary, for example in relatively simple viewing applications in which, for example, only the image of the camera 103 is displayed. The camera system 100 without the holder 116 allows use with any desired tool, e.g. including tools that are not fitted with a holder 116 and which also cannot be fitted because, for example, screwing is not permitted. The increased operating duration and a good ability to position the camera 103 can be realized, while hard wiring to the vehicle 200, for example hard wiring to the electrical system of the vehicle 200, is not necessary, In the various exemplary embodiments, the camera system 100 permits an increased range of application fields and possible applications for the mobile camera 103. The mobile camera 103 can be used in various application locations, for example autonomously or together with the holding devices 101, 106 and/or the holder 116. It is always possible here to omit hard wiring to the electrical system of the vehicle 200 for supplying the camera 103 with electrical energy. Highly varied applications are nevertheless possible without restriction.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A camera system for a vehicle, the camera system comprising:
   a holding device removably fastenable to an outside of the vehicle, wherein the holding devices comprises an accumulator;
   a camera removably fastenable to the holding device; and
   a second holding device removably fastenable to the holding device,
   wherein the accumulator is electrically connected to the camera to transfer electrical energy from the accumulator to the camera.

2. The camera system as claimed in claim 1, wherein the holding device comprises an energy transmitting device electrically coupled to the accumulator, and
   wherein the camera comprises an energy receiving device configured to wirelessly receive the electrical energy from the energy transmitting device.

3. The camera system as claimed in claim 1, wherein the holding device comprises a second energy receiving device electrically coupled to the accumulator, wherein the second energy receiving device is configured to wirelessly transmit electrical energy to the accumulator.

4. The camera system as claimed in claim 1, further comprising an electrical cable connection coupling the camera and the holding device.

5. The camera system as claimed in claim 1, wherein the camera comprises further comprising a second accumulator configured to receive the electrical energy from the accumulator.

6. The camera system as claimed in claim 1, wherein when the camera is fastened to the holding device, the camera is the camera is operable to receive position data from the holding device via wireless near-field communication and determine a relative position of the holding device with respect to the vehicle based on the position data.

7. The camera system as claimed in claim 1, wherein the holding device comprises a magnet, and
   wherein the holding device is removably fastenable to the vehicle via the magnet.

8. The camera system as claimed in claim 1, wherein the holding device comprises a signal amplifier for extending a range of a wireless transmission of a video signal of the camera.

* * * * *